Nov. 26, 1968     A. D. STRUBLE, JR     3,412,958

SUPPLY UNIT

Filed Oct. 13, 1965

# United States Patent Office 3,412,958
Patented Nov. 26, 1968

3,412,958
SUPPLY UNIT
Arthur D. Struble, Jr., 1754 S. Crenshaw Blvd.,
Torrance, Calif. 90501
Filed Oct. 13, 1965, Ser. No. 495,423
13 Claims. (Cl. 244—33)

ABSTRACT OF THE DISCLOSURE

A system for supplying energy, such as gas, liquids or electricity to a device such as a lighter-than-air balloon, located at one end of a line, from a supply station, such as an earth-located location, at the other end of the line, including, a carrier or body member mounted on the line and adapted to travel along the line, such as a lighter-than-air balloon surrounding the line and adapted to slide up the line to the remotely located lighter-than-air vehicle, gas, liquid and electrical supply units mounted within the body or carrier and adapted to be carried along the line with the body member, a bayonet-type coupling member connected to the gas, liquid and electrical supply unit and moved along the line therewith adapted to couple to a receiving element coupled to the balloon at the remote location, the bayonet and the receiving cup having complementary electrical contacts, gas and liquid supply tubes which puncture the frangible element in the supply bayonet and a seating ring which locks above spring-loaded clamps in the receiving cup, and appropriate sealing means to seal the bayonet in said cup for transmission of liquids or gases from the supply unit through the bayonet and into the remotely located vehicle. When the supply of gas, liquid or electricity from one supply unit has been exhausted, this supply unit may be destroyed or it may be left coupled to the remotely located vehicle, in which case the bottom of the supply unit has a receiving cup similar to that mounted on the remote vehicle for receiving the bayonet supply means of another supply unit.

---

The present invention relates to a device for supplying a remotely located device, having a cable leading to the supply area, such as, a freely floating or tethered lighter-than-air vehicle disposed above the surface of the earth, etc. A still more specific aspect of the present invention relates to apparatus for resupplying a remotely located device, having a cable leading to the supply area, with liquids, gases and/or electrical power.

Figure 2:
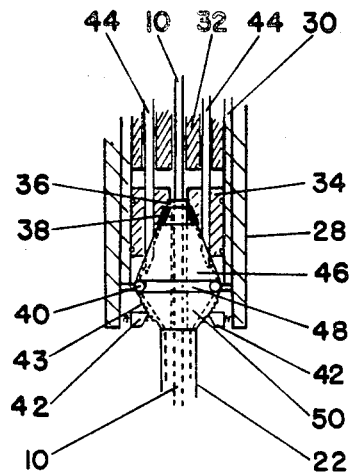
Figure 1:
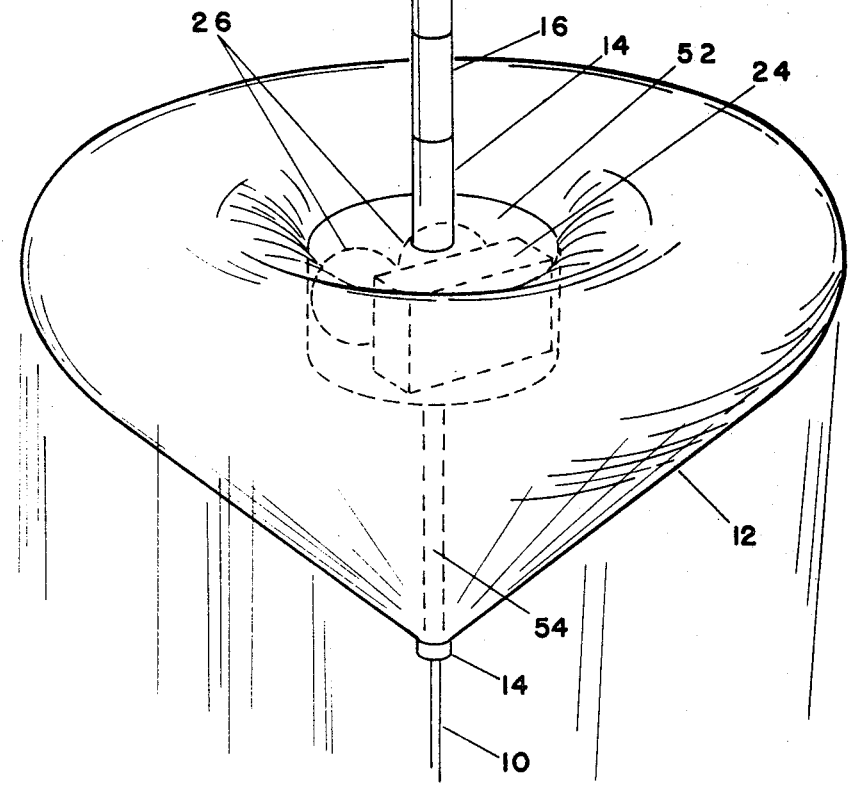

FIGURE 1 of the drawings shows an isometric view of the supply unit of the present invention; and FIGURE 2 shows a portion of the upper end of the supply unit making connection to a connector at the location of the vehicle being supplied.

As previously indicated, the present supply unit is capable of use in supplying any remotely located device whether air- or water-borne. However, for illustrative purposes an airborne system is referred to. In accordance with the drawings, a tethering cable or a cable carrying a load 10 has mounted thereon and passes through a balloon element 12. Balloon 12 is filled with a lighter-than-air gas which will thereby permit it to automatically ride up the cable 10 until it stops at the top of the cable. Mounted within the balloon 12 are storage batteries 24 and gas- or liquid-holding units 26. The batteries 24 and the holding units 26 are contained within a central chamber 52 mounted adjacent the center of balloon 12. Extending upwardly from balloon 12 and surrounding cable 10 are a plurality of tubular sections 14, 16, 18, 20 and 22 which form an annular passage about cable 10. This passage provides space for electrical lines, and the like, which generally follow line 10, and the passage of a gaseous or liquid medium. Section 50 attached to the top of section 22 is a seating ring against which spring loaded clamps 42 seat to hold the device when the device is in position for supplying the remote vehicle. Section 40 above section 50 provides a strengthening or mounting band for the section 46. Section 46 acts as a stop when the device is in the supply position and also has a rupturable membrane which can be punctured to release gas or liquid. Section 38 is an electrical contact element and 36 is a de-icing element adapted to remove ice from cable 10 as the vehicle slides upwardly on the cable. Chamber 48 is generally hollow and is in open communication with the annular space about cable 10 and the containers 26. When the balloon has reached its uppermost position adjacent the vehicle to be supplied the bayonet-type upper end makes contact with a receeiving means adjacent the vehicle. This receiving means comprises an outer casing 28 and 30; internally disposed electrical contacts 34 which meet with and cooperate with element 38 to supply power to the vehicle from storage battery 24, and gas or liquid tubes 44 which supply gas or liquid to the vehicle being supplied. Tubes 44 also serve to puncture membrane 46 and supply gas or liquid to the vehicle from containers 26. Stopper 32 forms an appropriate seal about tubes 44 and cable 10.

The containers 26 may carry any appropriate lifting gas for the vehicle being supplied, either in gaseous, liquid or solid form. Appropriate gases which may be included are ammonia, decomposition products of hydrazine, gaseous hydrogen, liquid hydrogen, methane and the like. One of the most attractive lifting gases which may be delivered in accordance with the present invention is hydrazine, wherein $N_2H_4$ is decomposed by the use of a catalyst into hydrogen, nitrogen and trace amounts of ammonia. Containers 26 may also provide any of a number of other liquids or gases, such as, water, insecticides, warfare gases, solid foods or other solids as a slurry or in suspension in gases or liquids, solids or liquids in foam or aerosol form, etc. It should also be recognized that any means of maintaining sufficient pressure on the gas or liquid, to force it into tubes 44 and thence to the vehicle being supplied, can be used, such as, direct gas or aerosol pressure, extraneous fluid pressure, pumps and the like operated by the batteries and other known techniques.

After the vehicle has been supplied, the supply device may be retrieved in any suitable way as by manually pulling the unit down with a line of its own, releasing the gas from balloon by remote control or other techniques. It should also be recognized that the unit may be essentially expendable and not retrieved but simply used as a conduit for another supply unit. For example, lower end 14 may take the form of the receiving unit of FIGURE 2 and tube 54 can be fitted with electrical lines and conduits such as tube 44.

It is also within the purview of the present invention to power the unit along the cable by means other than the lifting force of a gas. For example, a power driven wheel riding the cable could be used.

While numerous examples have been given and specific structures described it is to be understood that these are simply illustrative and the invention is to be limited only in accordance with the appended claims.

I claim:

1. A lighter-than-air supply unit for supplying energy to a remotely located balloon device having at least one tethering line extending from said balloon device to a supply location, comprising:

(a) a lighter-than-air body member coupled to said line and adapted to slide along said line from one location along said line adjacent said supply location to a second location along said line spaced from said first location and adjacent the remotely located balloon device;

(b) an energy supply unit mounted in said body member and movable therewith, and (c) coupling means for coupling said energy supply unit with said remotely located device when the body member has reached said point adjacent said remotely located device.

2. A unit in accordance with claim 1 wherein the body member annularly surrounds the line.

3. A unit in accordance with claim 1 wherein the energy supply unit is an electrical supply unit.

4. A unit in accordance with claim 1 wherein the energy supply unit is a fluid supply unit.

5. A unit in accordance with claim 4 wherein the energy supply unit is a gas supply unit.

6. A unit in accordance with claim 1 wherein the energy supply unit is a liquid supply unit.

7. A unit in accordance with claim 1 wherein the energy supply unit includes an electrical supply unit and a gas supply unit.

8. A unit in accordance with claim 1 wherein the energy supply unit is a fluid supply unit and means are provided at the point adjacent the remotely located device which will puncture an element in the coupling means to thereby release fluid and pass said fluid to said remotely located device.

9. A unit in accordance with claim 1 wherein the energy supply unit is an electrical battery unit and the coupling unit is adapted to make electrical contact with electrical receiving elements mounted at the point adjacent the remotely located device and electrically connected to the power supply of said remotely located device.

10. A unit in accordance with claim 1 wherein the coupling unit carries a cleaning means for removing foreign matter from the line as the body member slides along the line.

11. A unit in accordance with claim 10 wherein the cleaning means is a de-icing means for removing ice from the line.

12. A unit in accordance with claim 1 wherein the body member is a balloon-type body member annularly surrounding the line.

13. A unit in accordance with claim 12 wherein the energy supply unit is mounted adjacent the center of the body member.

References Cited

UNITED STATES PATENTS

| | | | |
|---|---|---|---|
| 3,369,673 | 2/1968 | Mosher | 244—33 |
| 461,895 | 10/1891 | Dion | 104—157 |
| 654,687 | 7/1900 | Suter | 104—22 |
| 2,329,430 | 9/1943 | Williams | 114—16.6 |
| 2,545,890 | 3/1951 | McKneely | 114—179 |
| 2,853,724 | 9/1958 | Smith | 9—9 |
| 3,162,870 | 12/1964 | Laird | 9—8.3 X |
| 3,260,480 | 7/1966 | Ash et al. | 244—31 |

MILTON BUCHLER, *Primary Examiner.*

T. MAJOR, *Assistant Examiner.*